United States Patent
Hsieh (10) Patent No.: US 11,719,371 B1
(45) Date of Patent: Aug. 8, 2023

(54) PARALLEL LATCH COUPLING HAVING LEAKPROOF ARRANGEMENTS

(71) Applicant: Hung-Yu Hsieh, Taichung (TW)

(72) Inventor: Hung-Yu Hsieh, Taichung (TW)

(*) Notice: Subject to any disclaimer, the term of this patent is extended or adjusted under 35 U.S.C. 154(b) by 0 days.

(21) Appl. No.: 17/679,359

(22) Filed: Feb. 24, 2022

(51) Int. Cl.
| *F16L 37/413* | (2006.01) |
| *F16L 37/098* | (2006.01) |
| *F16L 15/00* | (2006.01) |
| *G06F 1/20* | (2006.01) |

(52) U.S. Cl.
CPC .......... *F16L 37/413* (2013.01); *F16L 15/006* (2013.01); *F16L 37/098* (2013.01); *G06F 1/20* (2013.01)

(58) Field of Classification Search
CPC ..... F16L 37/413; F16L 15/006; F16L 37/098; G06F 1/20
USPC .......................................... 285/124.1–124.5
See application file for complete search history.

(56) References Cited

U.S. PATENT DOCUMENTS

| 2,628,850 | A | * | 2/1953 | Summerville | .......... F16L 37/42 251/149.7 |
| 4,982,736 | A | * | 1/1991 | Schneider | ............... F16L 37/56 607/104 |
| 5,588,954 | A | * | 12/1996 | Ribando | .............. A61H 9/0078 601/149 |
| 6,017,065 | A | * | 1/2000 | Hellesøe | ................... F16L 1/26 285/25 |
| 7,963,782 | B2 | * | 6/2011 | Hughes | ................ H01R 13/641 439/181 |
| 2022/0029316 | A1 | * | 1/2022 | Wu | ...................... H01R 13/639 |

* cited by examiner

*Primary Examiner* — James M Hewitt, II (57) ABSTRACT

A latch coupling includes male and female connector assemblies releasably secured together. The male connector assembly includes two parallel male connectors and first latches. The female connector assembly includes two parallel female connectors and second latches. A sleeve is releasably connected to an end of the female connector. Force is exerted on the second latches to hook the first latches so as to connect the female and male connector assemblies together. The parallel female connectors can be disconnected from the parallel male connectors or connected together at the same time. After the female connectors have disengaged from the male connectors, leakproof arrangements in the female connector assembly act to prevent water in the female connector assembly from leaking.

8 Claims, 12 Drawing Sheets

PARALLEL LATCH COUPLING HAVING LEAKPROOF ARRANGEMENTS

FIELD OF THE INVENTION

The invention relates to couplings and more particularly to a parallel latch coupling having leakproof arrangements used in fluid applications.

BACKGROUND OF THE INVENTION

Operations of integrated circuit (IC) chips play a great role in obtaining information. The higher of performance of IC chips the greater of generated heat is. IC chips and substrates may be malfunctioned due to high temperature. Fluid based cooling is critical to desktops, laptops and display cards. Thus, it is desirable to have a leakproof coupling used in fluid applications.

Figure 12:
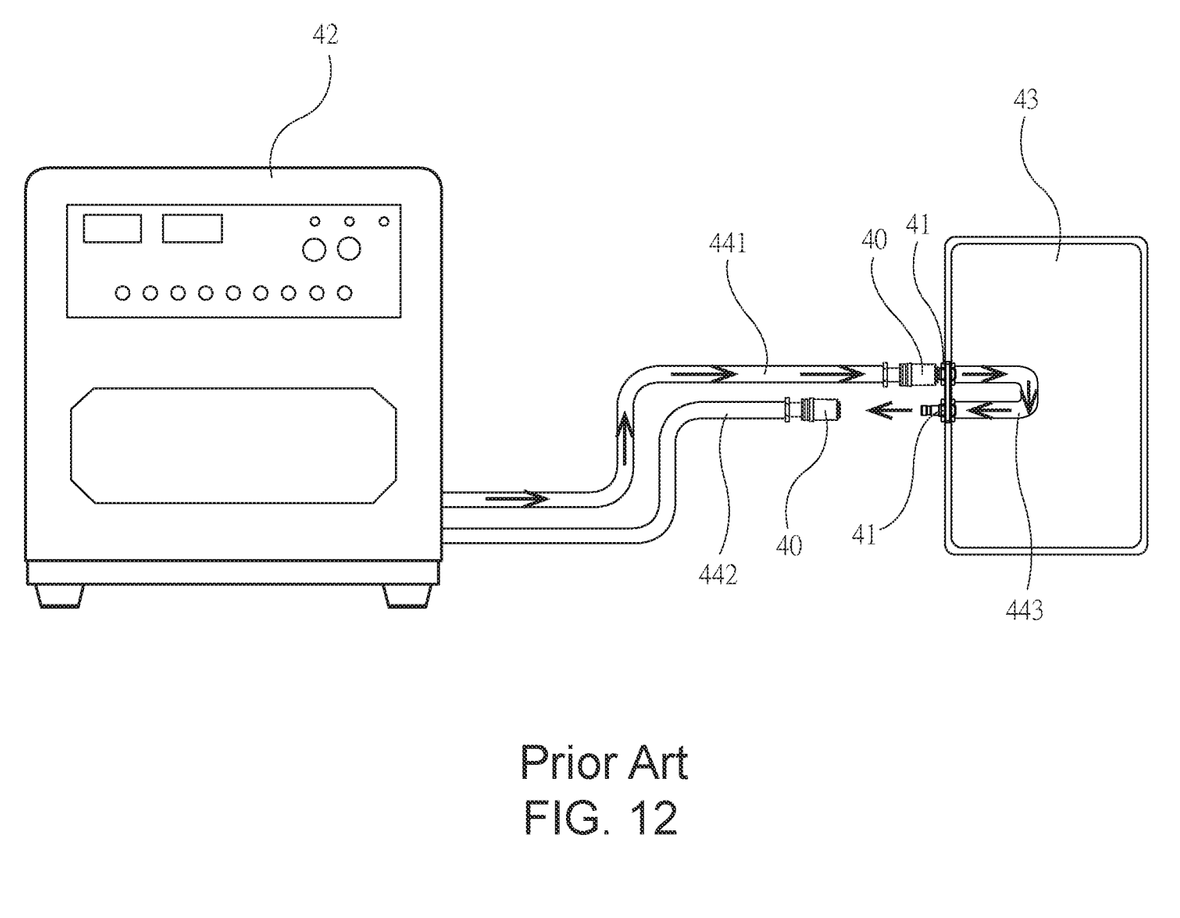
FIG. 12 schematically depicts a conventional coupling application in which two male connectors are attached to a laptop, two female connectors are attached to an inlet pipe and an outlet pipe respectively, and only one female connector is attached to the male connector, and a cyclic water flow path is indicated.

Referring to FIG. 12, it schematically depicts an application involved a conventional coupling including two female connectors 40 and two male connectors 41 connected to the female connectors 40 respectively. One female connector 40 is connected to an end of an inlet pipe 441 and the other female connector 40 is connected to an end of an outlet pipe 442. A water pipe 443 for absorbing heat is disposed in a laptop 43 and interconnects the male connectors 41. Hot water carried from the water pipe 443 flows to the outlet pipe 442 and in turn to a cooling device 42 to be cooled. The cooled water then flows to the water pipe 443 through the inlet pipe 441. This completes a cooling cycle. A leakproof arrangement is provided in the female connector 40. The male connectors 41 are smaller. The installation of leakproof arrangement may occupy internal space of the male connector 41, resulting in a decrease of the cooling water flowing through the male connector 41. Thus, there is no leakproof arrangement in the male connector 41. However, a connection of the female connector 40 to the corresponding male connector 41 may cause hot water in the water pipe 443 to leak out of the joining portion of the female connector 40 and the corresponding male connector 41, or a disconnection of the female connector 40 and the corresponding male connector 41 may cause hot water in the water pipe 443 to leak out of the disconnected portion of the female connector 40 and the corresponding male connector 41. When the pump of the cooling device 42 operates, a great quantity of cooling water may leak out of the disconnected portion of the female connector 40 and the corresponding male connector 41.

Thus, the need for improvement still exists.

SUMMARY OF THE INVENTION

It is therefore one object of the invention to provide a coupling comprising a male connector assembly including two male connectors and a first board assembly including a first board and two first nuts wherein the male connectors each are axially hollow and include an annular first flange on an outer surface, the first board includes two spaced first through holes through one surface and the other surface, the first board assembly further comprises two parallel first extensions extending from the other surface of the first board, each of the first extensions including a first latch at an open end, and the first latch pointing outward, the male connectors are disposed through the first through holes respectively, the first nuts each are threadedly secured to a first externally threaded section of the male connector, and the first board has one surface urging against the other surfaces of the first flanges so that the male connectors are parallel; and a female connector assembly including two female connectors, a second board assembly, two plunger assemblies, and two sleeves wherein the female connectors each are axially hollow and include an annular second flange on an outer surface, an annular first groove adjacent to the second flange, and a sleeve sealing ring disposed on the first groove, the second board assembly includes a second board and two second nuts, two spaced second holes are through the second board, the second board assembly further comprises two parallel second extensions extending through two sides of the second board respectively, each second extension including a second latch at an open end, and the second latch pointing inward, the female connectors are disposed through the second holes respectively, the second nuts each are threadedly secured to a second externally threaded section of the female connector, the second board has one surface urging against the other surfaces of the second flanges so that the female connectors are parallel, the sleeve includes at least one annular groove in an inner surface, and at least one male connector sealing ring disposed in the at least one annular groove respectively, the plunger assemblies each are spring loaded and disposed in both the sleeve and the female connector, the plunger assembly and the first nut are spaced apart with the second board disposed between them, and the sleeve sealing ring engages with the inner surface of the sleeve; wherein force is exerted on the second latches to hook the first latches so as to connect the female connector assembly to the male connector assembly, when the male connector exerts a force on the plunger assembly, the force exerted by the male connector moves the plunger assembly toward the female connector and compresses the spring loaded plunger assembly to disengage from the male connector sealing ring, and inside of the male connector communicates with insides of both the plunger assembly and the female connector; and wherein force is exerted to disengage the second latches from the first latches so as to disconnect the female connector assembly from the male connector assembly, the plunger assembly is locked in the sleeve, the plunger assembly is engaged with the male connector sealing ring, and the plunger assembly does not communicate with the inside of the female connector.

The invention has the following advantages and benefits in comparison with the conventional art: the female connector assembly has two parallel female connectors which can be disconnected or connected at the same time. After the female connectors have disengaged from the male connectors, the leakproof arrangements in the female connector assembly act to prevent water in the female connector assembly from leaking.

The above and other objects, features and advantages of the invention will become apparent from the following detailed description taken with the accompanying drawings.

DETAILED DESCRIPTION OF THE INVENTION

Referring to FIGS. 1 to 9, a parallel latch coupling in accordance with a first preferred embodiment of the invention comprises a male connector assembly 10 and a female connector assembly 20 releasably connected to the male connector assembly 10 as discussed in detail below.

Figure 1:
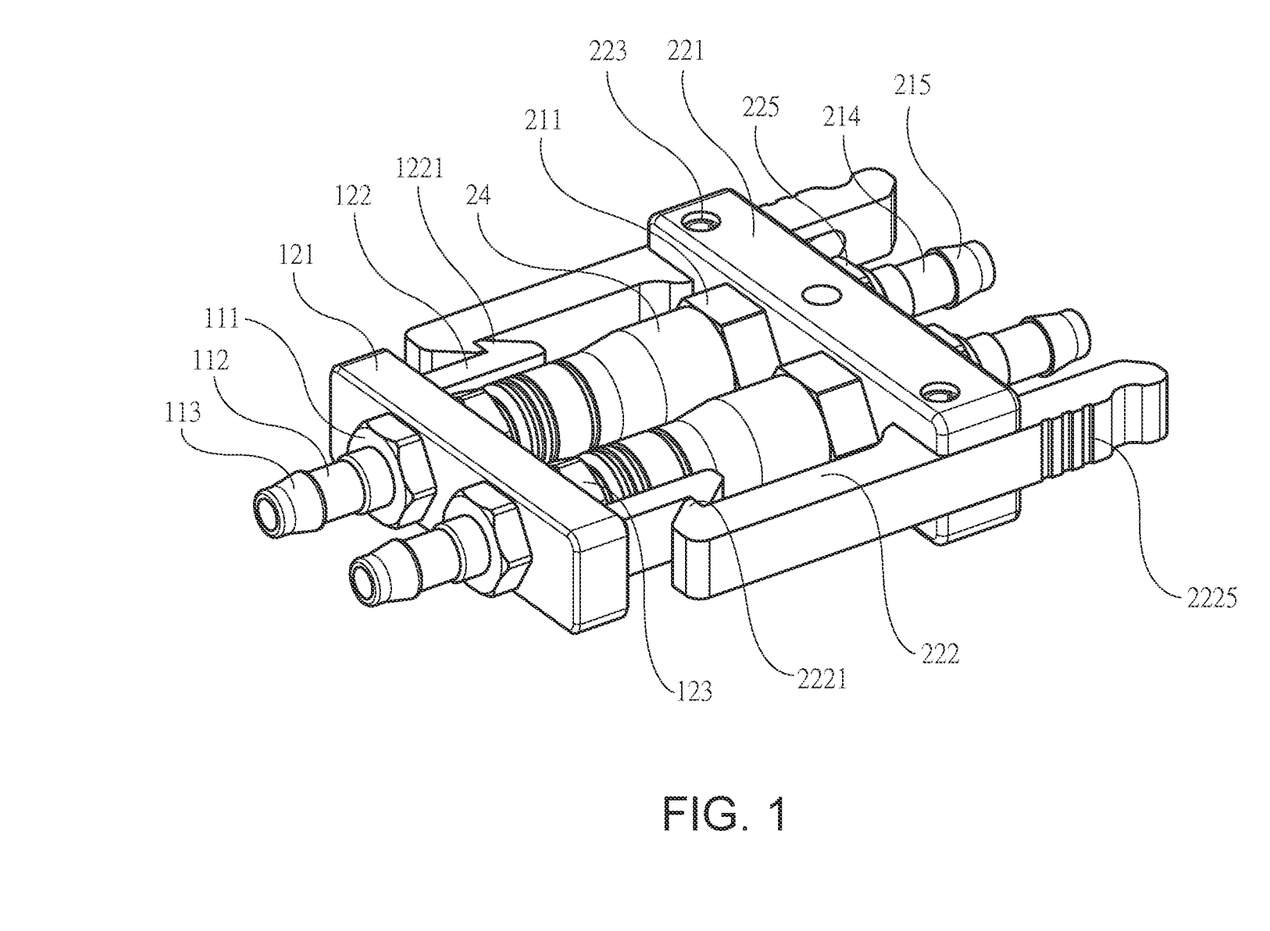
FIG. 1 is a perspective view of a parallel latch coupling according to a first preferred embodiment of the invention.
Figure 2:
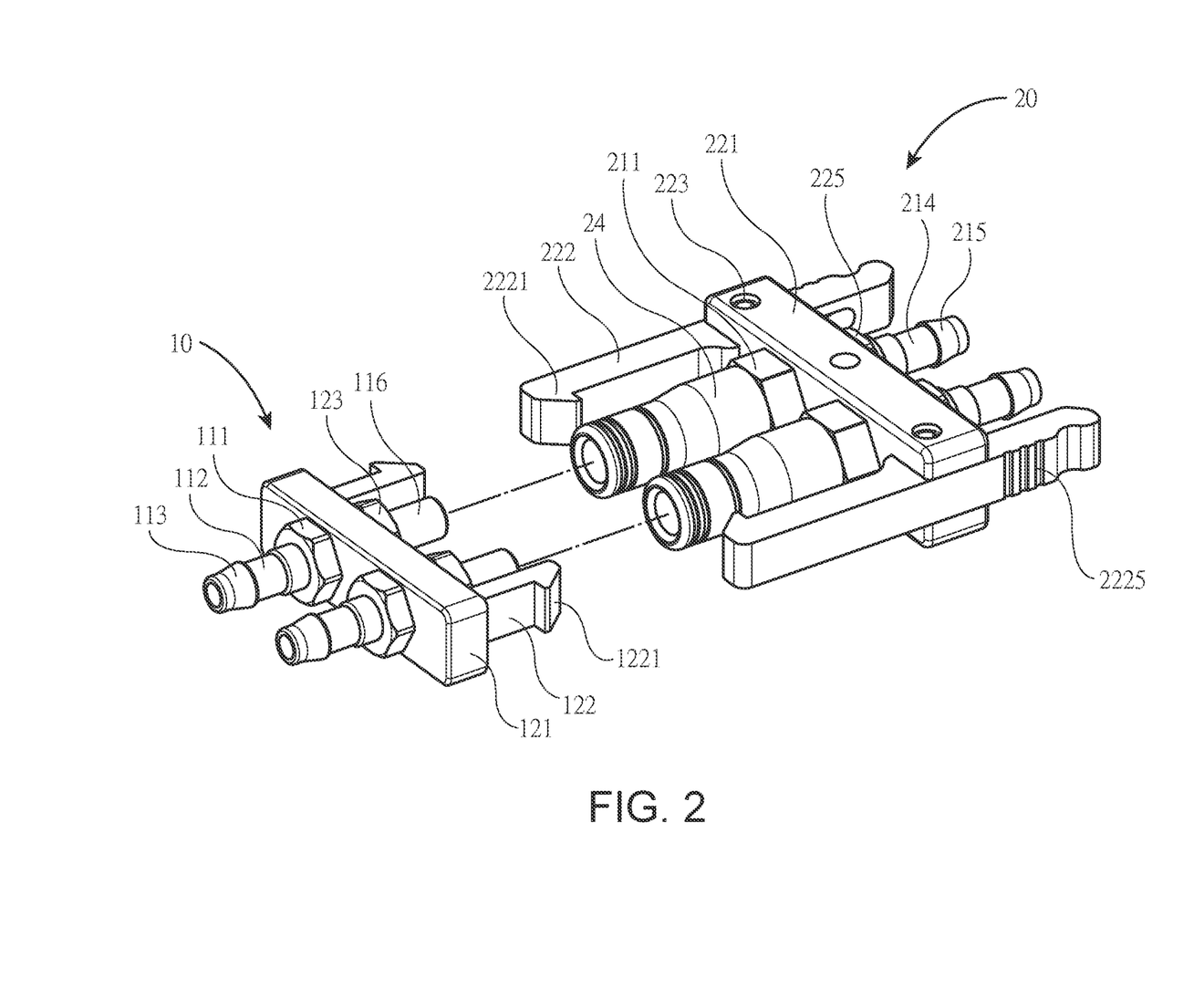
FIG. 2 is an exploded, perspective view of FIG. 1 with the male connector assembly disengaged from the female connector assembly.
Figure 3:
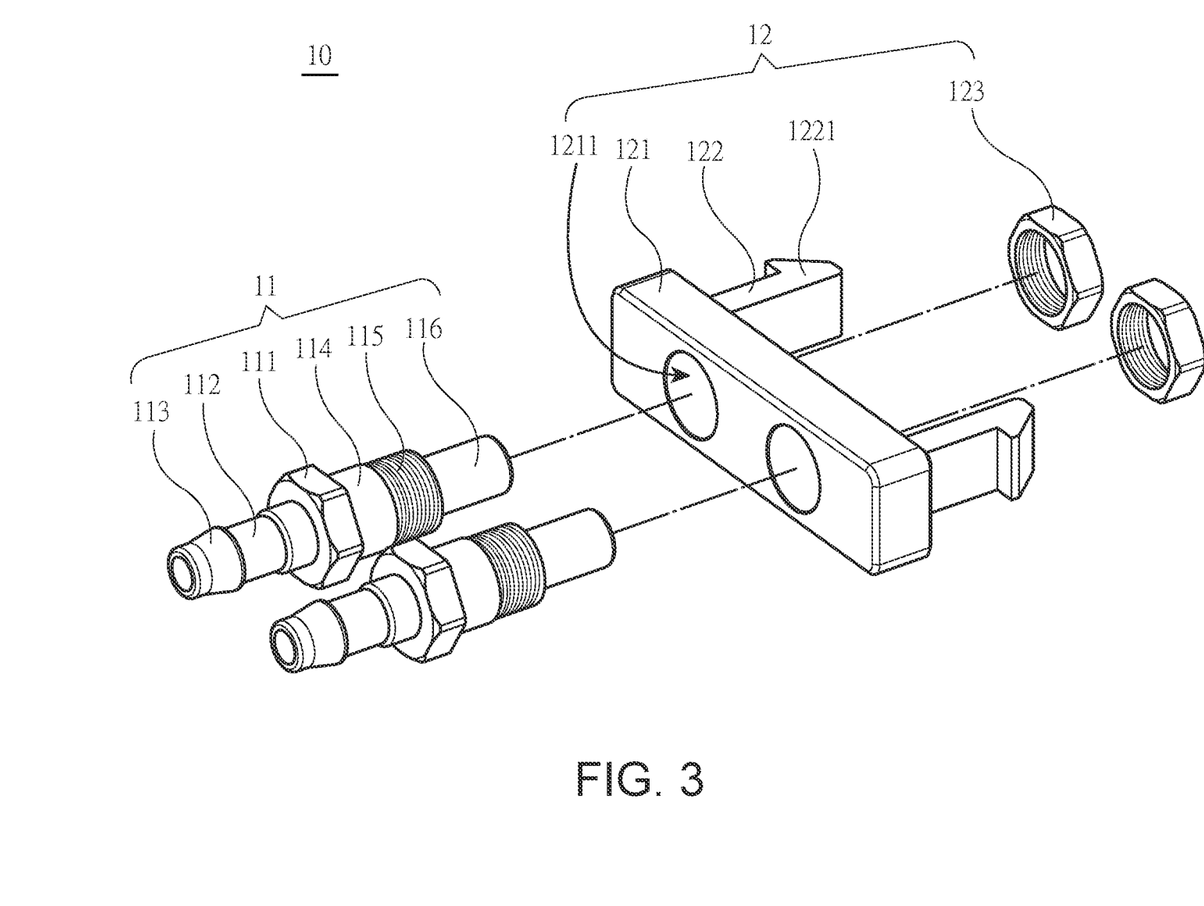
FIG. 3 is an exploded view of the male connector assembly.
Figure 6:
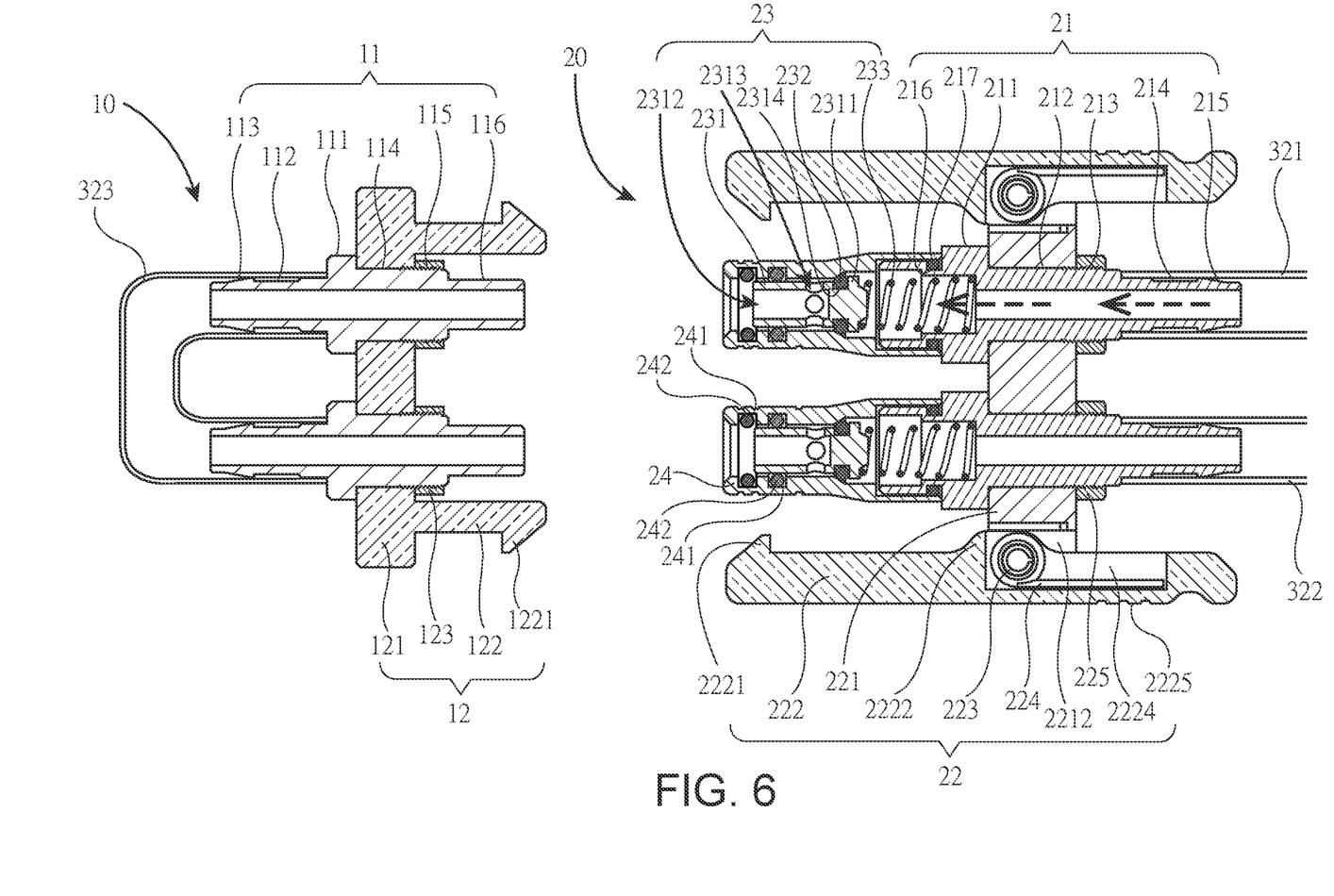
FIG. 6 is a sectional view showing the male connector assembly disengaged from the female connector assembly.

As shown in FIGS. 3 and 6 specifically, the male connector assembly 10 includes two male connectors 11 and a first board assembly 12 including a first board 121 and two first nuts 123. The male connector 11 is axially hollow and includes an annular first flange 111 on an outer surface. The first board 121 includes two spaced first holes 1211 through one surface and the other surface. The first board assembly 12 further comprises two parallel first extensions 122 extending from the other surface of the first board 121, each first extension 122 including a first latch 1221 at an open end, the first latch 1221 pointing outward. The male connectors 11 are disposed through the first holes 1211 respectively. The first nut 123 is threadedly secured to a first externally threaded section 115 of the male connector 11. The first board 121 has one surface urging against the other surfaces of the first flanges 111 so that the male connectors 11 are parallel.

The male connector 11 further comprises an axial first extension 112 extending from one surface of the first flange 111, and a first enlargement 113 disposed at an open end of the first extension 112 and having a cross-section greater than that of the first extension 112. The diameter of the first enlargement 113 gradually increases toward the first extension 112. The male connector 11 further comprises a first support section 114, the first externally threaded section 115, and a joining section 116 all axially, sequentially extending from the other surface of the first flange 111. A cross-section of the joining section 116 is less than that of the first externally threaded section 115, the cross-section of the first externally threaded section 115 is less than that of the first support section 114, and the cross-section of the first support section 114 is less than that of the first hole 1211. The first support section 114 is disposed in the first hole 1211. The first nut 123 is threadedly secured to the first externally threaded section 115.

Figure 4:
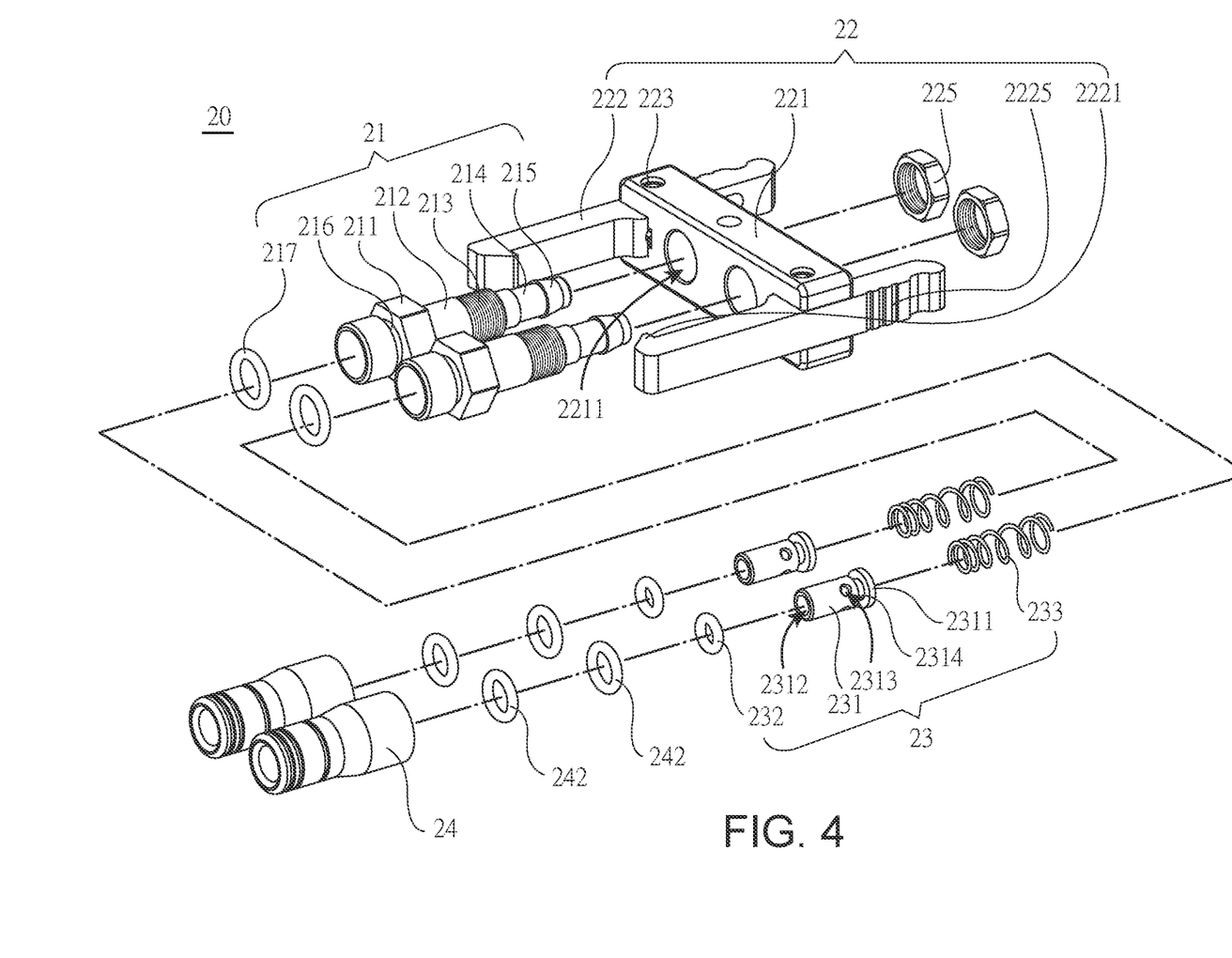
FIG. 4 is an exploded view of the female connector assembly.

As shown in FIGS. 4 and 6 specifically, the female connector assembly 20 includes two female connectors 21, a second board assembly 22, two plunger assemblies 23, and two sleeves 24. The female connector 21 is axially hollow and includes an annular second flange 211 on an outer surface, an annular first groove 216 adjacent to the second flange 211, and a sleeve sealing ring 217 disposed in the first groove 216. The second board assembly 22 includes a second board 221 and two second nuts 225. Two spaced second holes 2211 are through the second board 221. The second board assembly 22 further comprises two parallel second extensions 222 extending through two sides of the second board 221 respectively, each second extension 222 including a second latch 2221 at an open end, the second latch 2221 pointing inward. The female connectors 21 are disposed through the second holes 2211 respectively. The second nut 225 is threadedly secured to a second externally threaded section 213 of the female connector 21. The second board 221 has one surface urging against the other surfaces of the second flanges 211 so that the female connectors 21 are parallel. The sleeve 24 includes a plurality of annular grooves 241 in an inner surface, and a plurality of male connector sealing rings 242 disposed in the annular grooves 241 respectively. The spring loaded plunger assembly 23 is disposed in both the sleeve 24 and the female connector 21. The plunger assembly 23 and the first nut 225 are spaced apart with the second board 221 disposed between them. The sleeve sealing ring 217 engages with the inner surface of the sleeve 24.

The female connector 21 further comprises a second support section 212, the second externally threaded section 213, a second extension 214, and a second enlargement 215 disposed at an open end of the second extension 214 all axially, sequentially extending from the other surface of the second flange 211. The second enlargement 215 has a cross-section greater than that of the second extension 214. The diameter of the second enlargement 215 gradually increases toward the second extension 214. A cross-section of the second extension 214 is less than that of the second externally threaded section 213, the cross-section of the second externally threaded section 213 is less than that of the second support section 212, and the cross-section of the second support section 212 is less than that of the second hole 2211. The second support section 212 is disposed in the second hole 2211. The second nut 225 is threadedly secured to the second externally threaded section 213.

The plunger assembly 23 includes a plunger 231 including an opening 2312 at one end and an urging member 2311 at the blind other end, a plurality of through holes 2313 through a cylindrical surface of the plunger 231 and communicating with the opening 2312, an annular second groove 2314 disposed on the cylindrical surface of the plunger 231 and between the through holes 2313 and the urging member 2311, a plunger sealing ring 232 disposed in the second groove 2314, and a plunger spring 233 having one end urging against the urging member 2311 and the other end urging against stepped-diameter inside of the female connector 21. The plunger spring 233 is implemented as a variable spring and tapered from the female connector 21 to the plunger 231, i.e., a diameter of the plunger spring 233 being increased from one end to the other end.

Figure 5:
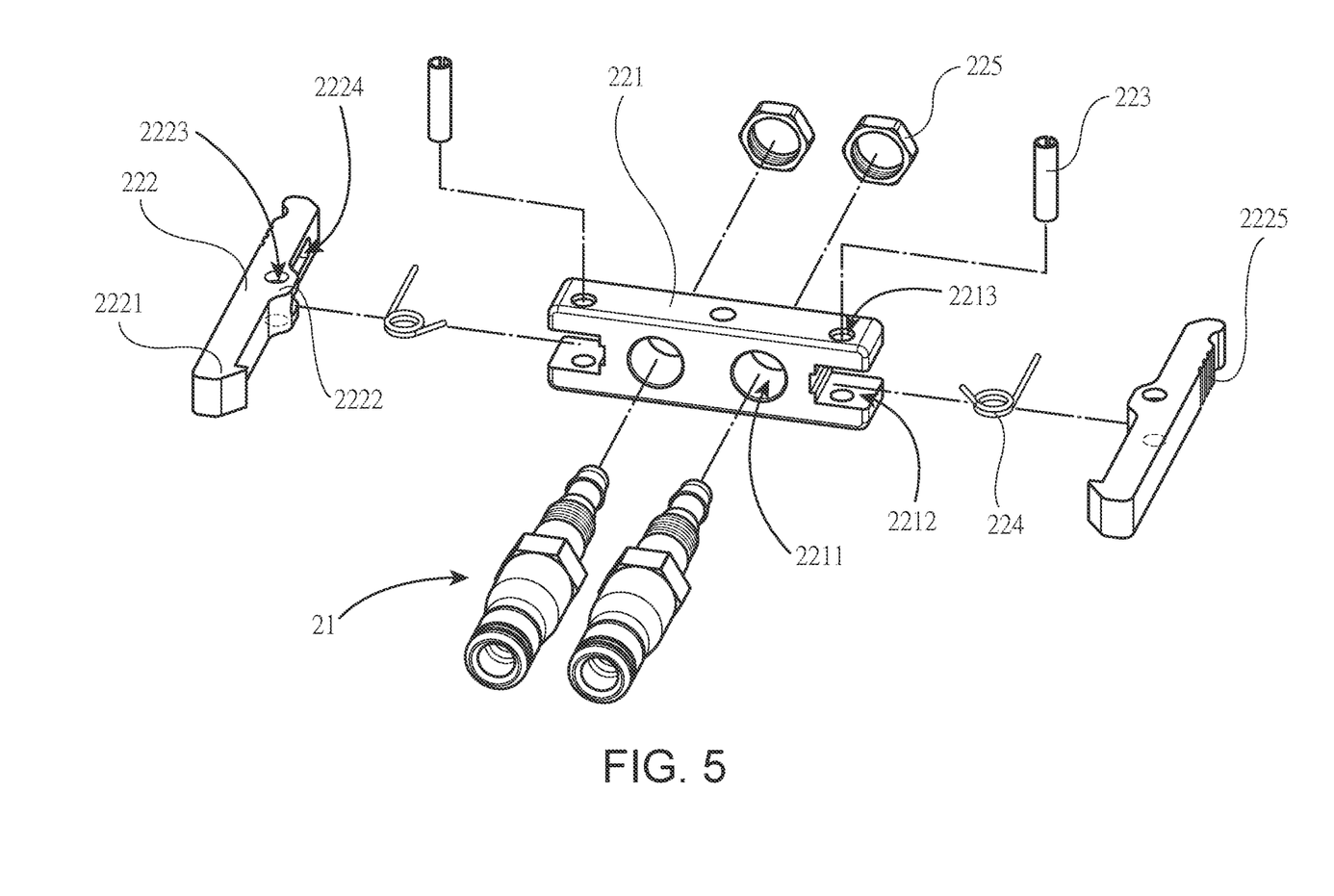
FIG. 5 is an exploded view of the second board assembly.

As shown in FIGS. 4 and 5 specifically, the second board 221 includes two recesses 2212 at two sides respectively, and two first through holes 2213 vertically passing through the recesses 2212 respectively. The second extension 222 is disposed through the recess 2212 and includes a projection 2222 on an intermediate portion of an inner surface. The projection 2222 is complementarily disposed in the recess 2212. A second through hole 2223 is vertically provided through the projection 2222. A well 2224 is provided on the inner surface of the second extension 222 and has one end communicating with the second through hole 2223. A torsion spring 224 is provided in the well 2224. A knurled member 2225 is provided on an outer surface of the second extension 222 and spaced apart from the well 2224. A pin 223 is provided through the first through hole 2213, the second through hole 2223, and the torsion spring 224. In detail, the pin 223 is driven through one part of the first through hole 2213, one part of the second through hole 2223, the torsion spring 224, the other part of the second through hole 2223, and the other part of the first through hole 2213 so that the second extension 222 is pivotably secured to the second board 221 about the recess 2212.

Figure 8:
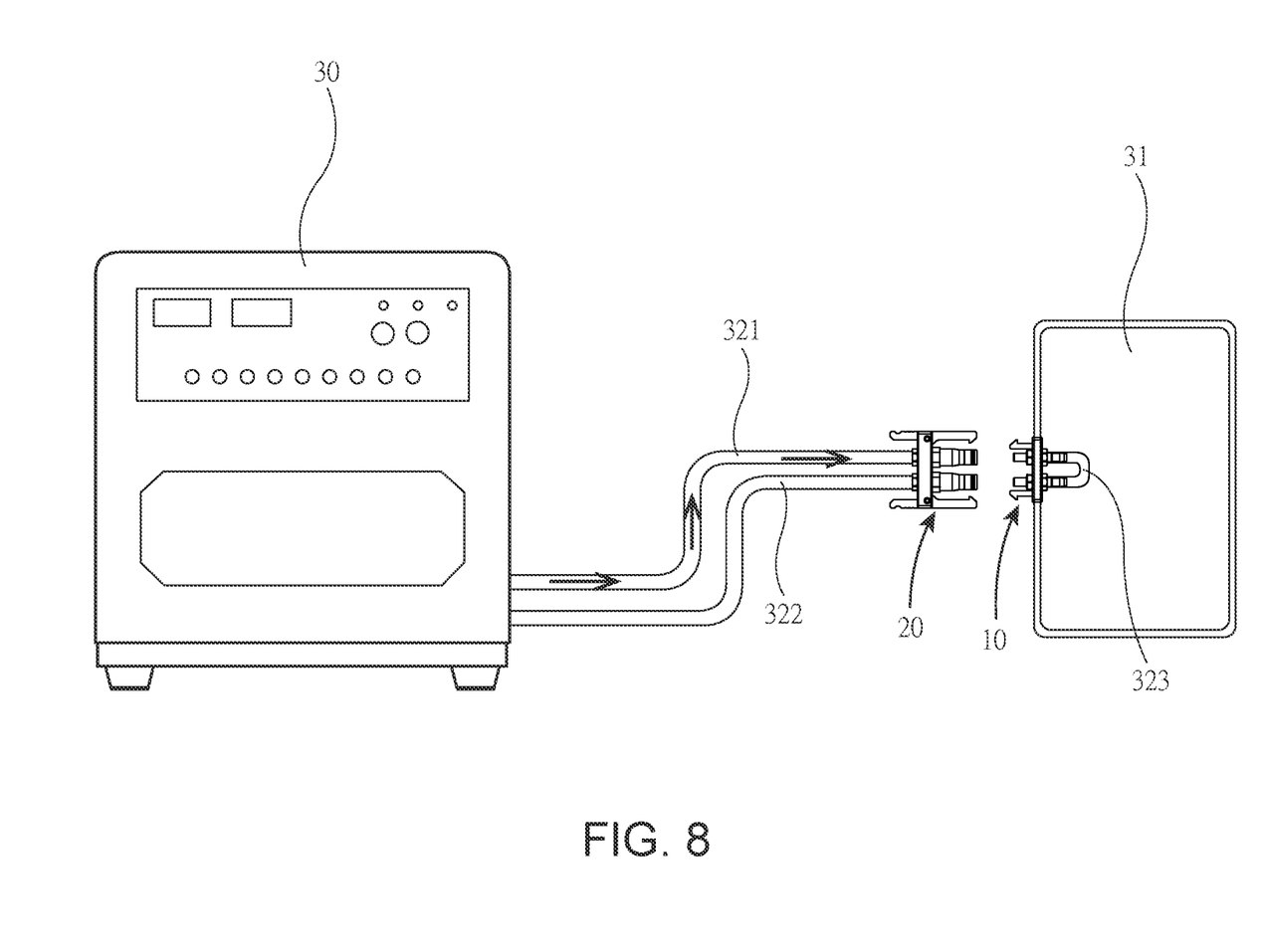
FIG. 8 schematically depicts an application of the parallel latch coupling of the invention in which the male connector assembly is attached to a laptop, the female connector assembly is attached to an inlet pipe and an outlet pipe respectively, the female connector assembly is not connected to the male connector assembly, and a cyclic water flow path is indicated.

As shown in FIGS. 6 and 8 specifically, the sleeve 24 includes the two annular grooves 241 each with the male connector sealing ring 242 disposed therein. This has the benefit of closing and then pushing the plunger 231 prior to inserting the male connector 11 into the female connector 21. Otherwise, the insertion of the male connector 11 into the female connector 21 may open the flow channel to leak water. Thus, it can prevent leaking. The male connector 11 is attached to a socket on one side of a laptop 31. The female connectors 21 are connected to an inlet pipe 321 and an outlet pipe 322 respectively. A water pipe 323 for absorbing heat is disposed in the laptop 31 and interconnects the male connectors 11 of the male connector assembly 10. The outlet pipe 322 passes through a cooling device 30 and in turn connects to and in fluid communication with the inlet pipe 321. When the female connector assembly 20 and the male connector assembly 10 are not connected together, the plunger assembly 23 is disposed in the sleeve 24, the male connector sealing ring 242 urges against an outer surface of the plunger 231, and the plunger assembly 23 does not communicate with inside of the female connector 21.

Figure 7:
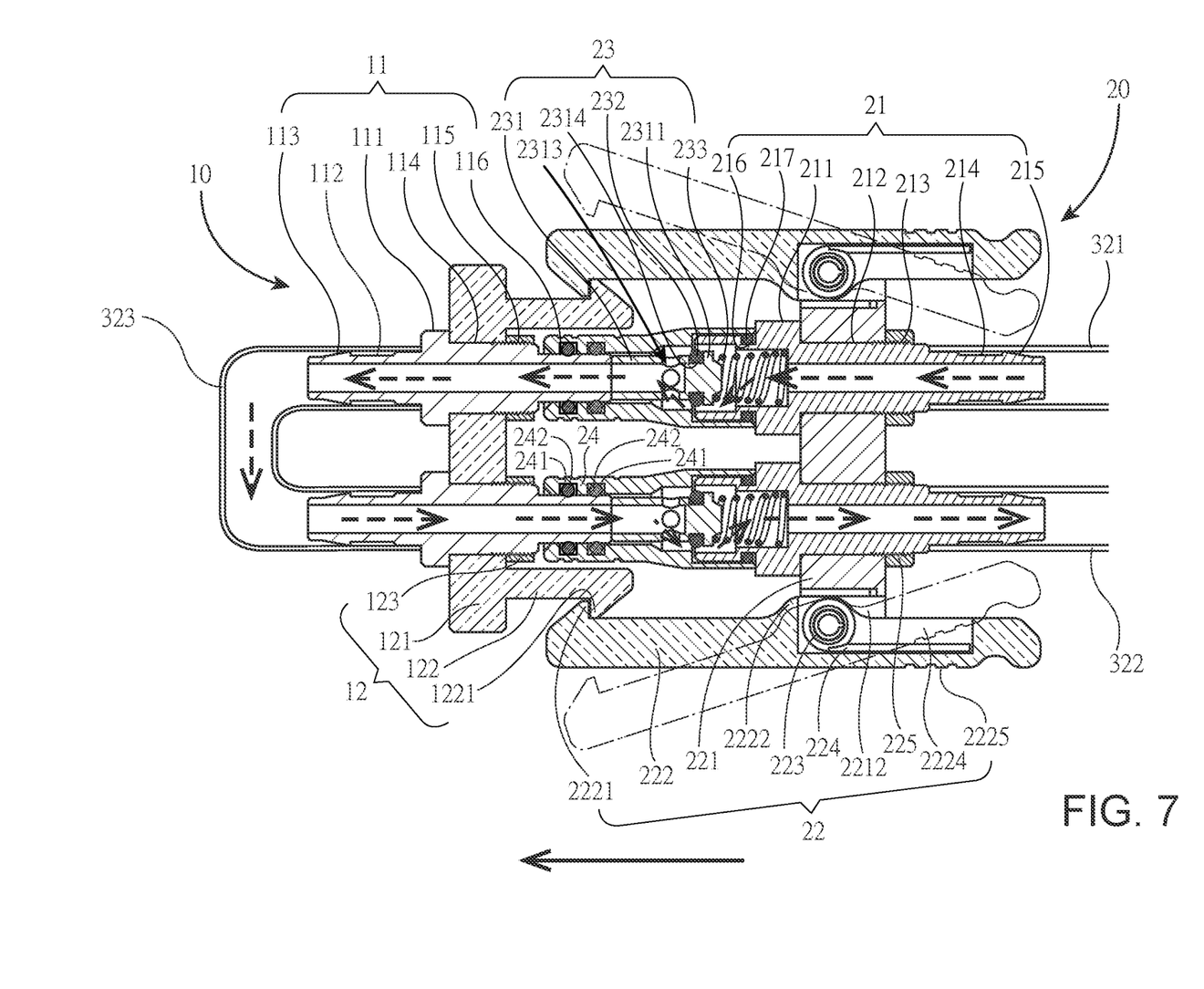
FIG. 7 is a sectional view showing the male connector assembly and the female connector assembly assembled.
Figure 9:
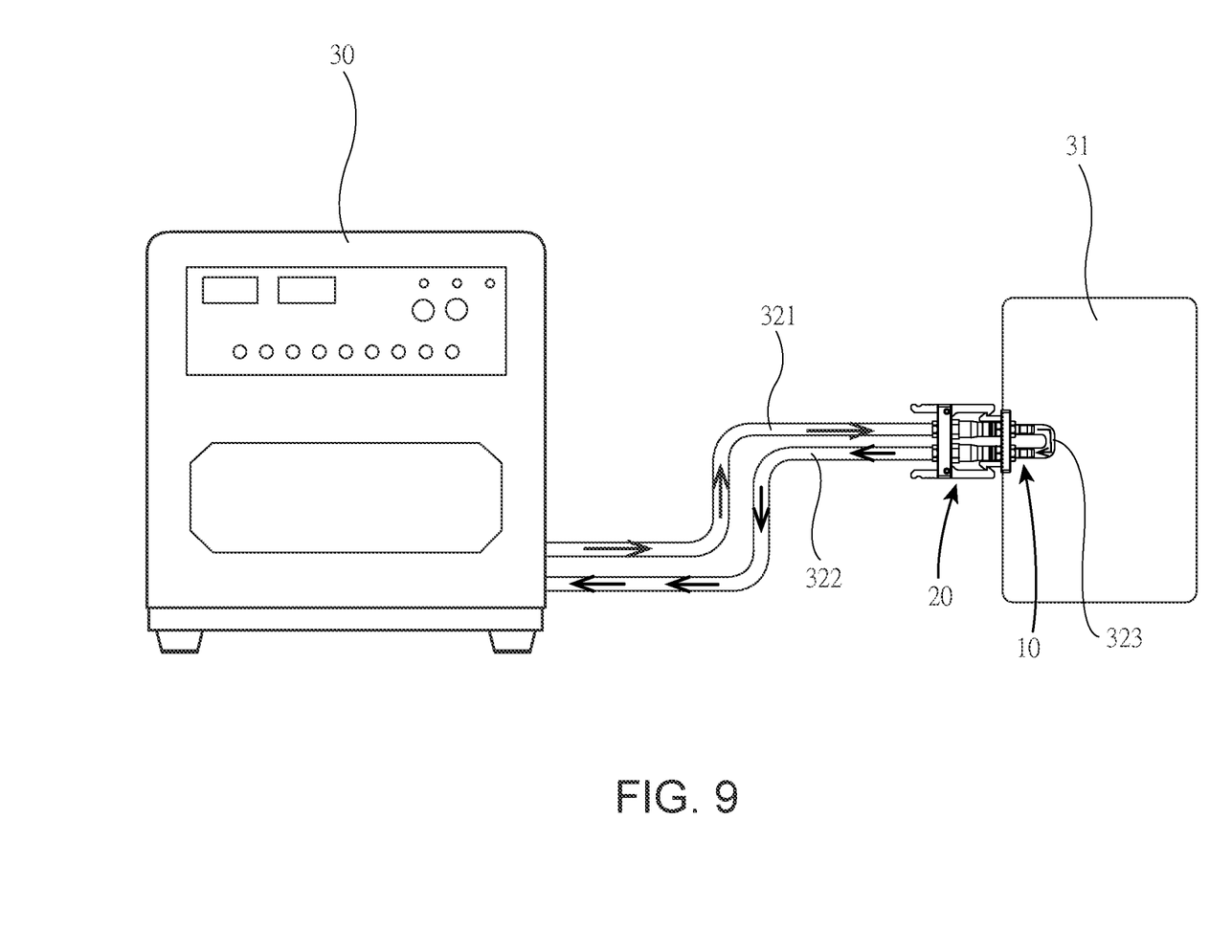
FIG. 9 is a view similar to FIG. 8 showing the two female connectors connected to the two male connectors respectively at the same time, and a cyclic flow path.

As shown in FIGS. 7 and 9 specifically, force may be exerted on the second latches 2221 to hook the first latches 1221 so as to connect the female connector assembly 20 to the male connector assembly 10. When the male connector 11 exerts a force on the plunger assembly 23, the force exerted by the male connector 11 moves the plunger assembly 23 toward the female connector 21 and compresses the plunger spring 233 to disengage the plunger assembly 23 from the male connector sealing ring 242. When the joining section 116 of the male connector 11 inserts into the sleeve 24 and the male connector assembly 10 and the female connector assembly 20 are connected together, with the provisions of both the plunger sealing ring 232 and the male connector sealing ring 242, the inner surface of the sleeve 24 is engaged with both the plunger sealing ring 232 and the male connector sealing ring 242. Inside of the male connector 11 communicates with the opening 2312 of the plunger 231 which communicates with the through holes 2313 which also communicates with inside of the female connector 21. In other words, inside of the male connector 11 communicates with insides of both the plunger assembly 23 and the female connector 21. When the joining section 116 of the male connector 11 inserts into the sleeve 24, Water cooling carried out by the parallel latch coupling of the invention is discussed below. Fluid flows through the inlet pipe 321, one female connector 21, one corresponding male connector 11, and the water pipe 323 in the laptop 31 to absorb heat of the laptop 31. Hot water carried from the water pipe 323 flows through the other male connector 11, the other corresponding female connector 21, and the outlet pipe 322 prior to entering the cooling device 30 to be cooled. The cooled water then flows to the inlet pipe 321. This completes a cooling cycle. It is envisaged by the invention that the laptop 31 can be effectively cooled. With the parallel female connectors 21 held in place, the female connectors 21 can be connected to the male connectors 11 respectively at the same time, or the female connectors 21 can be disconnected from the male connectors 11 respectively at the same time. Fluid begins to flow when the male connector assembly 10 and the female connector assembly 20 are connected together. Thus, leaking is prevented. The parallel latch coupling of the invention can be also applied to desktop or display card for absorbing heat generated in operation.

Figure 10:
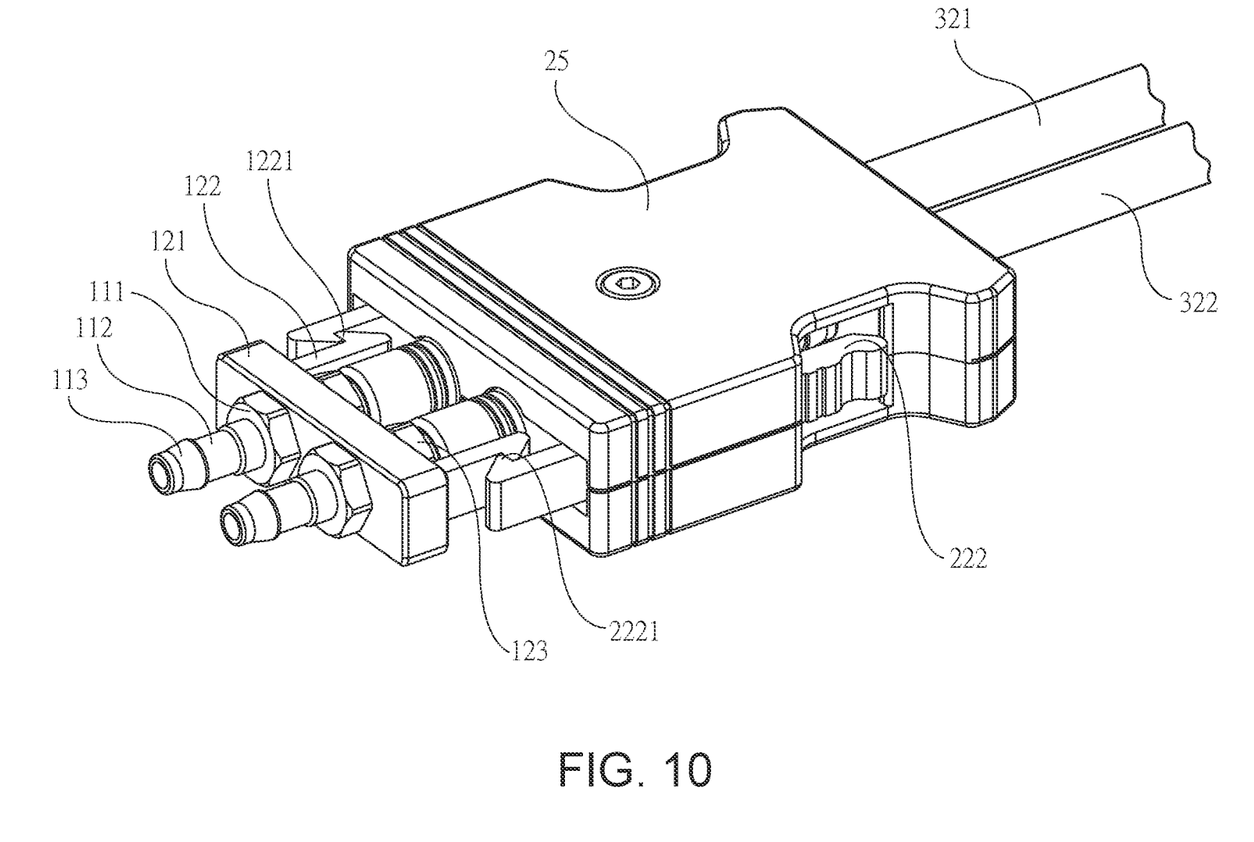
FIG. 10 is a perspective view of a parallel latch coupling according to a second preferred embodiment of the invention in which a housing is provided.
Figure 11:
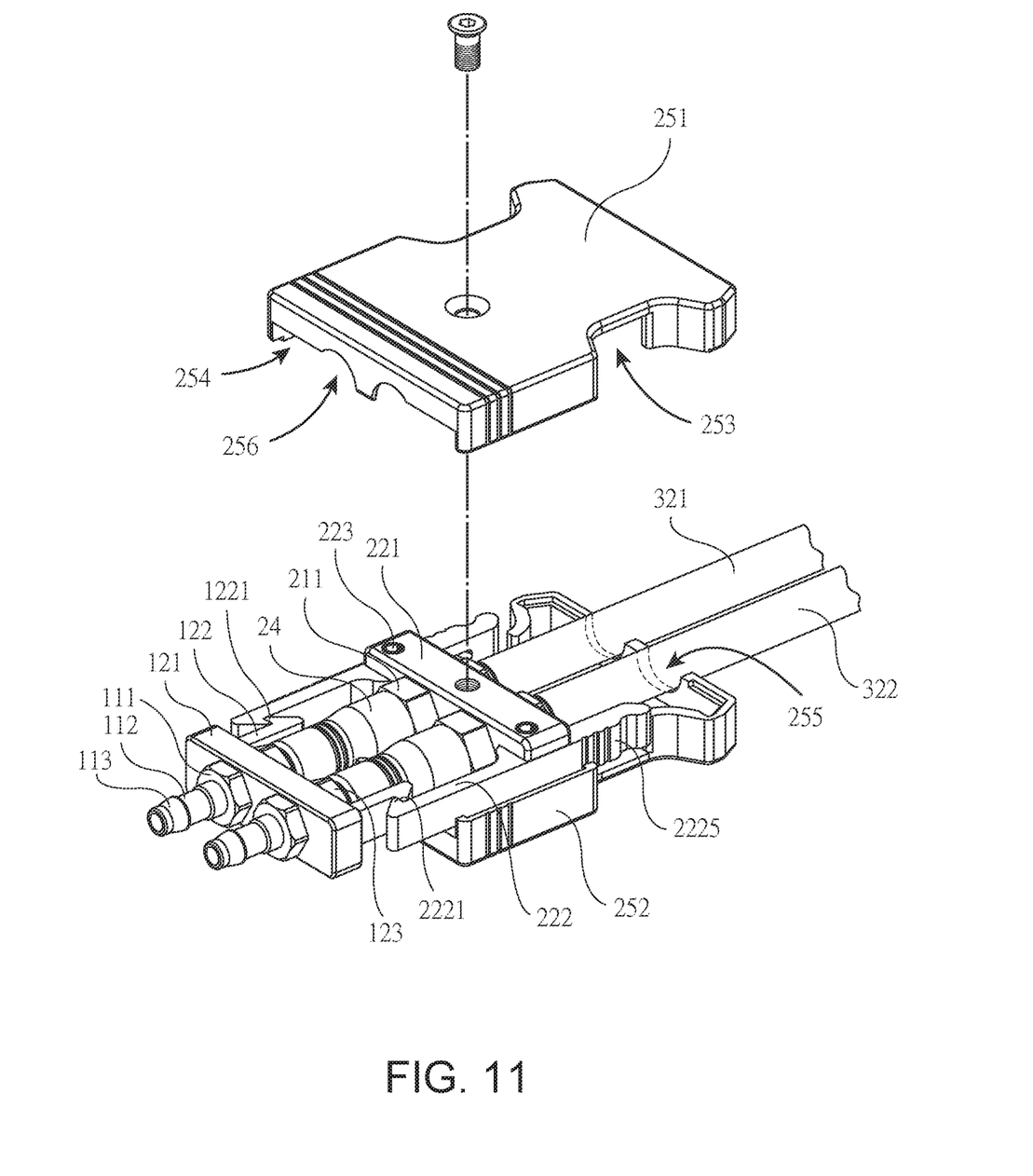
FIG. 11 is an exploded view of FIG. 10.

Referring to FIGS. 10 to 11, a parallel latch coupling in accordance with a second preferred embodiment of the invention is shown. The characteristics of the second preferred embodiment are substantially the same as that of the first preferred embodiment except the following: A housing 25 is provided on the female connector assembly 20 and includes an upper shell 251 and a lower shell 252. A first channel 253 is provided through opposite recessed portions of sides of both the upper and lower shells 251, 252. Two spaced first grooves 255 are provided at rear ends of both the upper and lower shells 251, 252. The inlet pipe 321 passes through one first groove 255 to connect to one female connector 21 and the outlet pipe 322 passes through the other first groove 255 to connect to the other female connector 21 respectively. Two spaced second grooves 256 are provided at front ends of both the upper and lower shells 251, 252. Two second channels 254 are provided adjacent to the second grooves 256 in which one second channel 254 is provided at a left side of one second groove 256 and the other second channel 254 is provided at a right side of the other second groove 256 respectively. After the upper and lower shells 251, 252 have been assembled, a space is provided by the first and second channels 253, 254 to accommodate movement of the second extensions 222. Also, the sleeves 24 are held in place by the second grooves 256 respectively. With the provision of the housing 25, it is possible to prevent an advertent touch of the second extensions 222 from occurring. Otherwise, the second latches 2221 may be disengaged from the first latches 1221.

While the invention has been described in terms of preferred embodiments, those skilled in the art will recognize that the invention can be practiced with modifications within the spirit and scope of the appended claims.

What is claimed is:

1. A coupling, comprising:
   a male connector assembly including two male connectors and a first board assembly including a first board and two first nuts,
   wherein each of the two male connectors is axially hollow and includes an annular first flange on an outer surface,
   wherein the first board includes two spaced first through holes each extending through a first surface and a second surface opposite to the first surface,
   and wherein the first board assembly further comprises two parallel first extensions each extending from the second surface of the first board, each of the two parallel first extensions including a first latch at an open end, and the first latch pointing outward,
   wherein each of the two male connectors is disposed through a corresponding first through hole of the first board respectively, each of the two first nuts is threadedly secured to a first externally threaded section of a corresponding one of the two male connectors, and the first board has the first surface urging against a first surface of corresponding first annular flanges of each of the corresponding two male connectors so that the two male connectors are parallel; and a female connector assembly including two female connectors, a second board assembly, two plunger assemblies, and two sleeves, wherein each of the two female connectors is axially hollow and include an annular second flange on an outer surface, an annular first groove adjacent to a first surface of the annular second flange, and a sleeve sealing ring disposed in the annular first groove, and wherein the second board assembly includes a second board and two second nuts, two spaced second holes extending through the second board, and the second board assembly further comprises two parallel second extensions extending through opposite sides of the second board respectively, each of the two parallel second extensions including a second latch at an open end, and the second latch pointing inward, and the two female connectors are disposed through the second holes respectively, each of the two second nuts is threadedly secured to a second externally threaded section of a respective female connector, the second board has a first surface urging against a second surface of the annular second flanges, opposite to the first surface of the annular second flanges, so that the two female connectors are parallel, each of the two sleeves includes at least one annular groove in an inner surface, and at least one male connector sealing ring disposed in the at least one annular groove respectively, each of the two plunger assemblies is spring loaded and disposed in a corresponding sleeve and female connector, wherein each of the plunger assemblies and corresponding second nut is spaced apart with the second board disposed between them, and each corresponding sleeve sealing ring engages with the inner surface of the corresponding sleeve;

wherein force is exerted on each second latch at the open end of each of the two parallel second extensions to hook each corresponding first latch at the open end of each of the two parallel first extensions so as to connect the female connector assembly to the male connector assembly, wherein when each of the two male connectors exert a force on a corresponding plunger assembly, the force exerted by each male connector moves the corresponding plunger assembly toward the corresponding female connector and compresses the corresponding spring loaded plunger assembly to disengage from the male connector sealing ring, and an inside of the male connector communicates with insides of both the corresponding plunger assembly and female connector; and wherein force is exerted to disengage each second latch from each corresponding first latch so as to disconnect the female connector assembly from the male connector assembly, each of the corresponding two plunger assemblies is locked in a corresponding sleeve, engaged with a corresponding male connector sealing ring, and does not communicate with the inside of the corresponding female connector.

2. The coupling of claim 1, wherein each of the two male connectors further comprises an axial first extension extending from a first surface of the corresponding annular first flange, and a first enlargement disposed at an open end of the axial first extension and having a cross-section greater than that of the axial first extension wherein a diameter of the first enlargement gradually increases toward the axial first extension, each of the two male connectors further comprises a first support section, the first externally threaded section, and a joining section all axially, sequentially extending from the first surface of the first annular flange, a cross-section of the joining section is less than that of the first externally threaded section, the cross-section of the first externally threaded section is less than that of the first support section, the cross-section of the first support section is less than that of the first through hole, the first support section is disposed in the first through hole, and the first nut is threadedly secured to the first externally threaded section.

3. The coupling of claim 2, wherein each of the two female connectors further comprises a second support section, the second externally threaded section, and a second extension disposed at an open end of the second extension all axially, sequentially extending from the second surface of the annular second flange, wherein the second enlargement has a cross-section greater than that of the second extension, a diameter of the second enlargement gradually increases toward the second extension, the cross-section of the second extension is less than that of the second externally threaded section, the cross-section of the second externally threaded section is less than that of the second support section, and the cross-section of the second support section is less than that of the corresponding one of the two second holes, the second support section is disposed in the corresponding second hole, and the corresponding second nut is threadedly secured to the second externally threaded section.

4. The coupling of claim 3, wherein the two plunger assemblies each include a plunger including an opening at one end and an urging member at a blind other end, a plurality of through holes through a cylindrical surface of the plunger and communicating with the opening of the plunger, an annular second groove disposed on the cylindrical surface of the plunger and between the through holes and the urging member, a plunger sealing ring disposed in the second groove, and a plunger spring having one end urging against the urging member and the other end urging against a stepped-diameter inside of the female connector, and wherein the plunger spring is implemented as a variable spring and tapered from the female connector to the plunger.

5. The coupling of claim 4, wherein the second board further includes two recesses at two sides respectively, and two first through holes vertically passing through the recesses respectively, each of the two second extensions is disposed through a corresponding recess and each includes a projection on an inner surface, the projection is complementarily disposed in the corresponding recess, a second through hole is vertically provided through the projection, a well is provided on the inner surface of the second extension and has one end communicating with the second through hole, a biasing member is provided in the well, a pin is provided through the first through hole, the second through hole, and the biasing member so that the second extension is pivotably secured to the second board about the corresponding recess.

6. The coupling of claim 5, further comprising a knurled member provided on an outer surface of each of the two second extensions and spaced apart from the corresponding well.

7. The coupling of claim 6, further comprising a housing provided on the female connector assembly, the housing including an upper shell, a lower shell, a first channel provided through two sides of both the upper and lower shells, two spaced first grooves provided at rear ends of both the upper and lower shells, two spaced second grooves provided at front ends of both the upper and lower shells, and two second channels are provided adjacent to the second grooves wherein one of the two second channels is provided at a left side of one second groove and the other of the two second channels is provided at a right side of the other second groove respectively.

8. The coupling of claim 7, wherein each of the two sleeves includes two annular grooves in an inner surface, and two male connector sealing rings disposed in the annular grooves respectively.

\* \* \* \* \*